Jan. 29, 1963
H. L. McCOMBS ETAL
3,075,350
GAS TURBINE FUEL CONTROL INCLUDING TIMING
DEVICE FOR SCHEDULING ACCELERATION
Filed Dec. 19, 1958
4 Sheets-Sheet 1
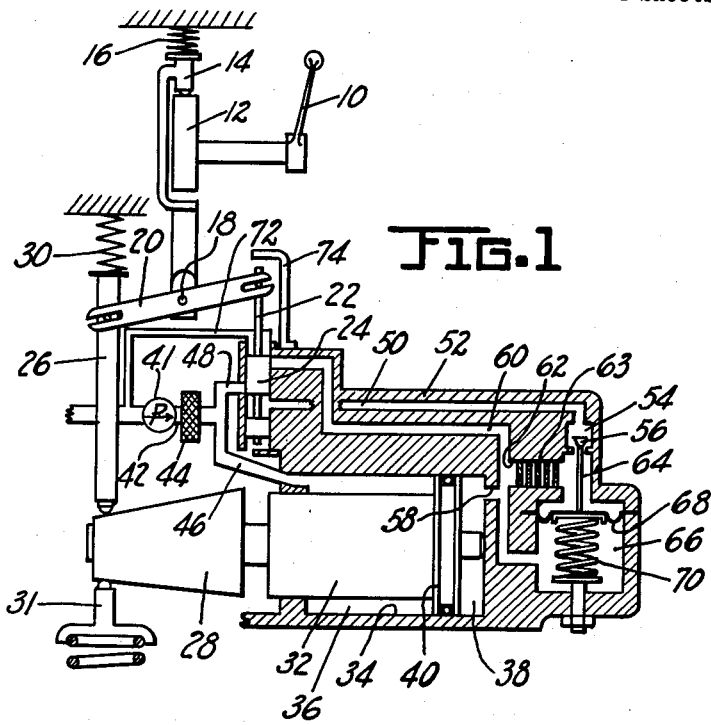
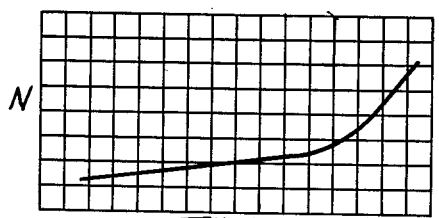
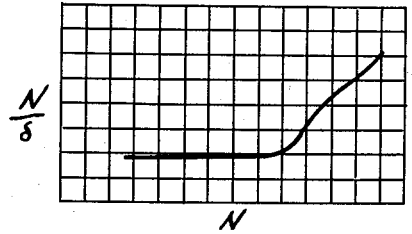
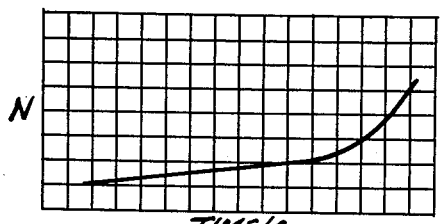
INVENTORS
HOWARD L. McCOMBS
ALBERT P. SCHNAIBLE
BY
*Robert C. Smith*
ATTORNEY

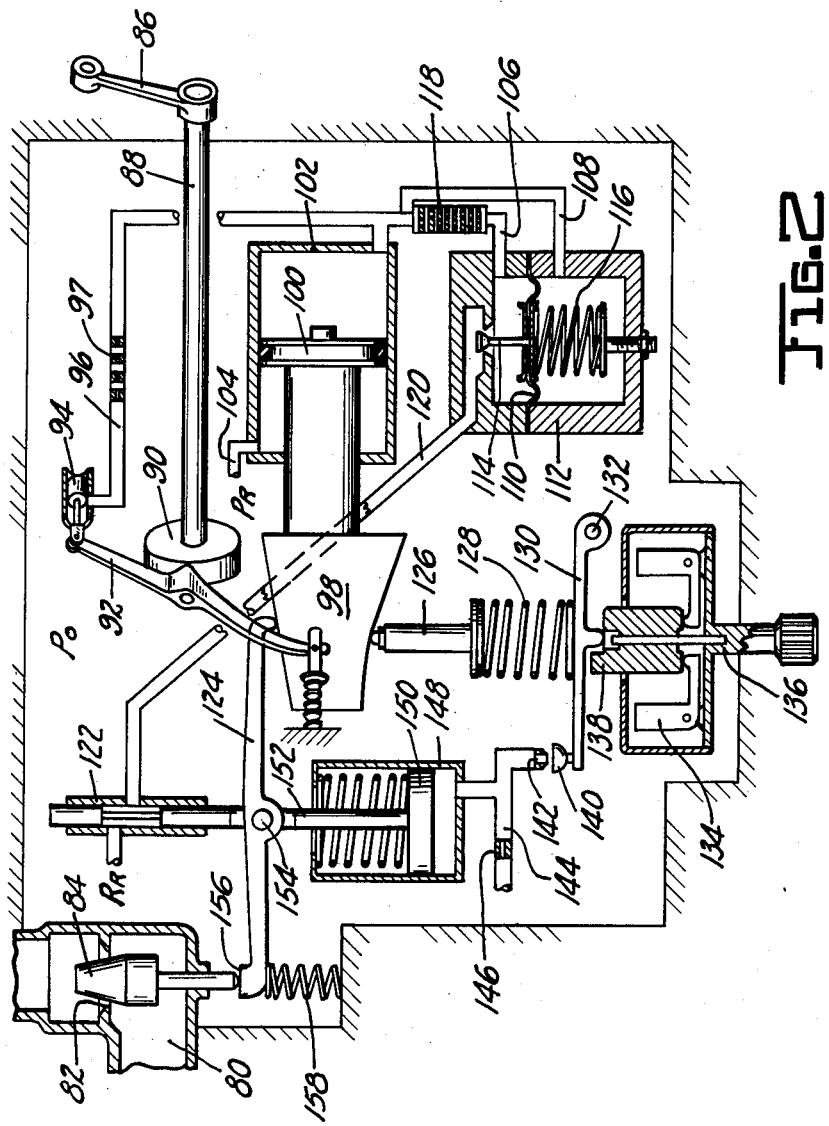

Jan. 29, 1963 H. L. McCOMBS ETAL 3,075,350
GAS TURBINE FUEL CONTROL INCLUDING TIMING
DEVICE FOR SCHEDULING ACCELERATION
Filed Dec. 19, 1958 4 Sheets-Sheet 3

INVENTORS
HOWARD L. McCOMBS
ALBERT P. SCHNAIBLE
BY
Robert C. Smith
ATTORNEY

INVENTORS
HOWARD L. McCOMBS
ALBERT P. SCHNAIBLE
BY Robert C. Smith
ATTORNEY

United States Patent Office 3,075,350
Patented Jan. 29, 1963

3,075,350
GAS TURBINE FUEL CONTROL INCLUDING TIMING DEVICE FOR SCHEDULING ACCELERATION
Howard L. McCombs and Albert P. Schnaible, South Bend, Ind., assignors to The Bendix Corporation, a corporation of Delaware
Filed Dec. 19, 1958, Ser. No. 781,641
14 Claims. (Cl. 60—39.28)

This invention relates to fuel systems and more particularly to a fuel system for a gas turbine engine incorporating timing means operative with an all-speed governor for controlling fuel flow to said engine during acceleration.

It is well known that the two most severe limiting factors on fuel flow during acceleration of a gas turbine engine are operating temperature and compressor stall. Recent studies have shown that stalling of the compressor occurs over a particular speed range when the acceleration rate exceeds a critical value. This speed range and the amount of fuel which may be tolerated over this range vary with ambient temperature and pressure. Although many controls have been made in which the fuel flow has been scheduled through the use of cams and other devices which respond to a plurality of engine control functions to avoid this region, it has been observed that the acceleration schedule always very nearly approximates a uniform acceleration rate—at least over the compressor stall range of speeds. Some of the recent designs have directly scheduled fuel flow as a function of a uniform acceleration rate, but this technique has proven extremely difficult to execute where mechanical or hydro-mechanical controls systems are involved, partly because of the unavailability of satisfactory mechanical acceleration sensing devices. Consequently, the vast majority of production controls for gas turbine engines operate with the combination of an all-speed governor which controls fuel flow only during steady state conditions and a separate acceleration scheduling means usually including its own separate speed sensing means which schedules fuel flow to the engine within its temperature and compressor stall limits. Inasmuch as these controls operate to schedule fuel flow by controlling the area of a metering orifice and/or the pressure drop across said orifice, it will be recognized that production tolerances on the dimensions and clearances of the respective valves, cams, and orifices are very rigid and compensating means are required for fuel temperatures, fuel of differing specific gravity or heat value, temperature coefficients of springs, etc. Because so many components must be made to such high tolerances and because of the additional structure required for the various compensating means, such controls are quite expensive and still require considerable maintenance. They cannot, for example, change their characteristics in accordance with the deterioration of the associated engine; thus an engine and control which operate satisfactorily together at one time, may later either require greater acceleration time or run into compressor stall after a number of hours use. Also an acceleration fuel schedule which is acceptable for one engine may not be satisfactory for another of the same type. It is, therefore, an object of the present invention to provide a fuel system for gas turbine engines in which fuel scheduling during acceleration is considerably less sensitive to engine deterioration or variations between individual engines, than is the case with present production controls.

It is another object to provide a fuel control for a gas turbine engine in which the tolerances on the individual parts are considerably lower and more in keeping with high volume production methods than in present fuel controls.

It is another object of the present invention to provide a fuel control for a gas turbine engine in which a substantial number of parts are eliminated without a corresponding loss in control performance.

It is another object of the present invention to provide a fuel control for a gas turbine engine in which a single governor structure controls fuel flow for both acceleration and steady state conditions.

It is another object of the present invention to provide a fuel control for a gas turbine engine in which timing means are employed such that an acceleration over any given speed range is always accomplished in substantially the same elapesd time.

It is another object to provide a fuel control for a gas turbine engine having particular utility in multi-engine aircraft installations where acceleration over a given speed range of all of a number of similar engines is automatically accomplished in substantially the same elapsed time thereby minimizing unbalanced forces which may tend to cause an undesirable change in the position of the aircraft.

It is a further object of the present invention to provide a hydraulic timing device for use with a gas turbine fuel control in which substantial forces are available to compensate for changes in loading of the actuated member during operation, thereby insuring uniform time cycles of operation.

It is a further object of the present invention to provide a hydraulic timing device for use with a gas turbine fuel control which accomplishes the above object and in which timing cycles of considerable duration are possible without requiring the use of excessively large actuating areas or restrictions so small as to be vulnerable to contaminants in the actuating fluid.

Other objects and advantages will become apparent from the following specification taken in connection with the accompanying drawings in which:

FIGURE 1 is a view, partly in section, of a simple version of our hydraulic timing device;

FIGURE 2 is a schematic diagram of a slightly modified form of our hydraulic timing device as incorporated into a gas turbine fuel system;

FIGURE 3 is a graph showing how the control of FIGURE 2 schedules governor speed versus time;

FIGURE 4 is a graph showing the characteristic curve produced when the time factor of the FIGURE 3 curve is corrected for changes in compressor intake pressure;

FIGURE 5 is a graph in which acceleration corrected for inlet pressure variations is plotted against engine speed for the device of FIGURE 2;

Figure 6:
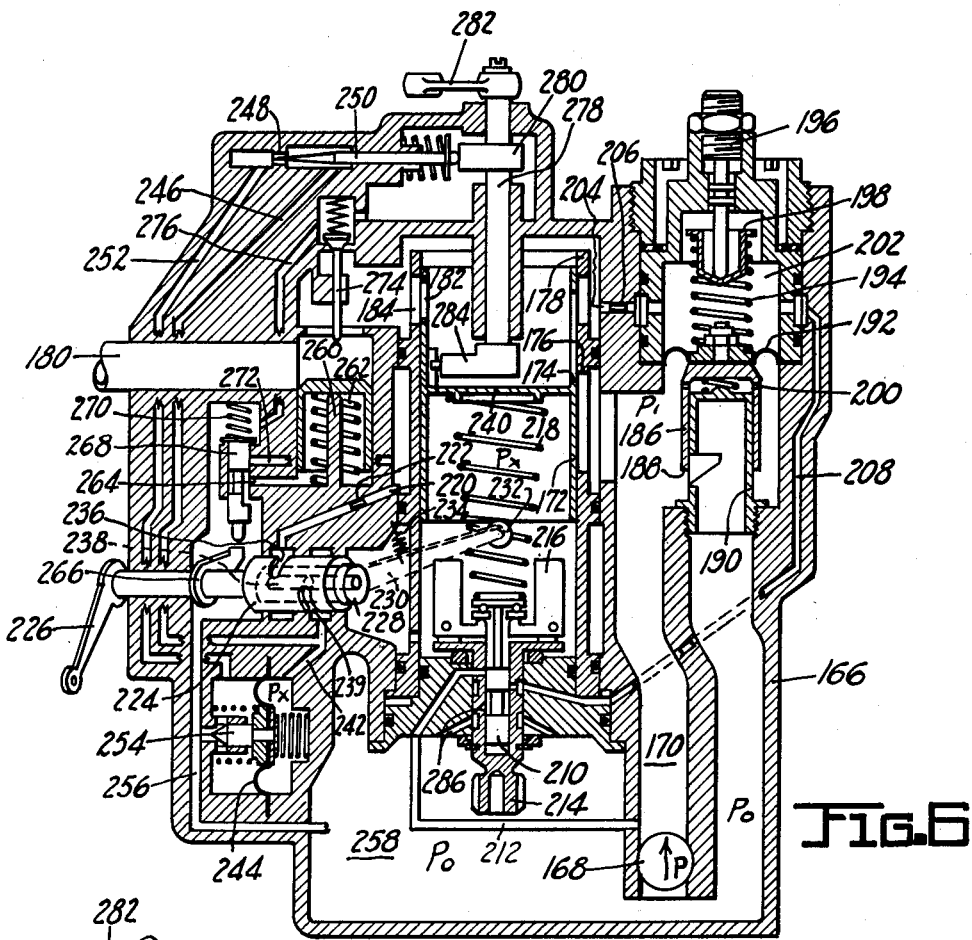
FIGURE 6 is a sectional view of a modified form of a gas turbine engine control in which a timed acceleration schedule is provided and altitude or inlet pressure compensation is performed manually.

FIGURE 1 shows a simple form of our hydraulic timing device having a power lever 10 which is adapted to receive a manual request signal and which causes rotation of a cam 12 having a follower member 14 held against its surface through the action of a spring 16.

The opposite end of follower member 14 is connected with a point 18 positioned along a link 20. One end of link 20 is connected to a shaft 22 which carries a pilot valve structure 24. The opposite end of lever 20 is connected to a cam follower member 26 which is held tightly against the surface of a cam member 28 by means of a spring 30. The output of the system appears on a second cam follower member 31 which has been shown as a spring retainer, but which may take any desired form depending upon the particular application for the timing device. Cam 28 is moved axially through the action of a power piston 32 positioned in a cylinder 34 which is divided into chambers 36 and 38 by means of the land 40, which is part of said piston 32. Actuating fluid is supplied to said piston from a pump 41 to a conduit 42 in which is positioned a filter 44. Part of the flow from filter 44 is carried through a conduit 46 to chamber 36 on the left side of land 40. The remainder of this flow is communicated with the pilot valve 24 through a conduit 48 where it is either blocked by one of the lands of said pilot valve, as shown, or permitted to communicate with a channel 50 in the timing device housing 52 which communicates with a chamber 54 on the upstream side of a valve 56. This flow is in communication with chamber 38 on the right side of land 40 through a conduit 58, a conduit 60, and a conduit 62 containing a plurality of bleeds 63 which communicates with a chamber 64 on the downstream side of valve member 56. Conduit 60 also communicates with a chamber 66 which is separated from chamber 64 by means of a diaphragm 68 biased by a spring 70. From the foregoing it is believed evident that the diaphragm 68 and spring 70 which act to position the valve 56 and which are in communication with opposite sides of the series of bleeds 63 act to control the pressure differential across said bleeds. Conduit 60 also communicates with pilot valve 24 and, as shown, this conduit is closed. Movement of valve 24 in a downward direction will, of course, permit flow from conduit 60 into a conduit 72 leading to the low pressure side of the pump 41. A stop member 74 is provided to limit the travel of the pilot valve member 24 in an upward direction.

Operation of this device is as follows: Assume a movement of the lever 10 in such manner as to rotate cam 12 to a position causing follower member 14 to raise and causing lever 20 to be rotated counterclockwise about its point of contact with member 26. This raises pilot valve 24, permitting high pressure fluid to communicate with conduit 50 and chamber 54. Flow continues across valve 56 into chamber 64, across bleeds 63 into conduits 60 and 58 and into chamber 38 when it acts against the right side of land 40. At the same time, of course, high pressure from the outlet of filter 44 is flowing through conduit 46 into the chamber 36 on the left side of land 40. Because of the substantial differential in effective area, the pressure acting in chamber 36 is effective to hold the piston 32 in the position shown only when there is a very low pressure in chamber 38 as when pilot valve 24 is substantially blocking communication between conduits 48 and 50. With such communication established, however, the pressure begins to build up in chamber 38 at a rate which is established principally by the effective area of the series bleeds 63, the pressure drop across the bleeds being controlled by the regulator valve 56. The piston 32 will then begin to move to the left at a rate controlled by the effective area of bleeds 63, carrying with it the cam 28. As cam 28 moves to the left, it causes the follower member 26 to be raised against the action of spring 30 and the left end of lever 20 is also raised which is now caused to be rotated around the point 18, thereby moving pilot valve 24 in a downward direction until it again interrupts communication between conduits 48 and 50. At this time, power piston 32 will stop and the system is stabilized at a new position of the cam 28. Movement of the power lever 10 in the opposite direction causes the pilot valve 24 to be moved downwardly thereby permitting communication between conduit 60 and conduit 72 and allowing the pressure in chamber 36 to be rapidly exhausted. This, of course, causes the piston 32 and the cam 28 to move toward the right whereby the follower 26 will move in a downward direction causing the lever 20 to move counterclockwise around point 18 and raise pilot valve 24 until the communication between conduits 60 and 72 is again interrupted.

From the foregoing, it will be observed that the follower member 31 will always respond to the action of the lever 10 in accordance with the time pattern established by the effective area of the bleeds 63. Where this system is used to control fuel flow to an engine, the follower 31 might be acting on the governor spring of an all-speed governor thereby causing said spring to be compressed on acceleration at a timed gradual rate, rather than suddenly. With respect to the operation of the pressure control system effective against the right side of land 40, it might be noted that the pressure drop across valve 56 will, in general, be substantial and will be considerably greater than the pressure drop across orifices 63. This has a number of advantages: in the first place, it is useful to maintain the pressure drop across orifices 63 at a comparatively low level so that these orifices need not be so small as to become readily obstructed by means of contaminants in the actuating fluid. The series bleeds are shown because this would permit the use of a plurality of comparatively large orifices which have the same effective drop as one small orifice which would be much more susceptible to blocking by contaminants. It will also be noted that the power piston is comparatively insensitive to load variations because any increased loading on this piston which might result from the accumulation of dirt in the cylinder or for any other reason will result in a decrease in velocity of piston 32, which in turn causes a reduction in flow and therefore a drop in the pressure differential across bleed 63, resulting in an opening of valve 56, bringing to bear a considerably greater pressure acting in chamber 38 against the right side of land 40. This, of course, will overcome any loading factors which might reasonably be expected to occur in the cylinder.

FIGURE 2 is a schematic diagram of a slightly modified form of our hydraulic timing device as incorporated into a simple type of gas turbine fuel control. In this device fuel is supplied from a source, not shown, to a conduit 80 having a metering restriction 82 and a movable valve member 84 therein for varying the effective area of said restriction. It will be assumed that this valve operates with a constant pressure drop across it. An acceleration or deceleration request is effected by means of a power lever 86 which is connected through a shaft 88 to a cam 90. When cam 90 is rotated in a direction of increasing rise, a lever 92 is caused to rotate counterclockwise around its lower end, and this results in pulling a timing piston 94 connected to the upper end of lever 92 to the left, thus blocking off a conduit 96 containing a series of deceleration bleeds 97 and which, as shown, is in communication with $P_0$ pressure in the interior of the enclosing case. The lower end of lever 92 acts as a cam follower riding on a cam 98 positioned by means of a power piston 100. Piston 100 is adapted to reciprocate in a cylinder 102 and its left side is in communication with a high pressure source of regulated servo pressure $P_R$ by means of a conduit 104. The right side of piston 100 is in communication with conduit 96 which, in turn, is in communication with a pair of conduits 106 and 108 which communicate with opposite sides of a diaphragm 110 positioned in a housing 112. Diaphragm 110 carries with it a regulating valve member 114 and this valve member is biased in the opening direction by means of a spring 116 acting against the lower side of diaphragm 110. Conduit 106 contains a series of bleeds 118 which are the acceleration timing bleeds analogous to bleed 63 in FIGURE 1. Regulating valve 114 is in communication through a conduit 120 with a source of $P_R$ pressure through a valve structure 122. In addition to lever 92, a lever 124 and a follower and spring retainer member 126 each ride on their respective contours formed on the appropriate surface of cam 98. Movement of cam 98 will result in transmitting through follower member 126 a force which varies the effective compression on a governor spring 128 which is seated on its lower end on a lever 130 pivoted at point 132. A pair of flyweights 134 are connected to shaft 136 which is driven by the associated engine and these flyweights control the effective position of a follower member 138 in direct response to engine speed. Member 138 and spring 128 act against lever 130 causing said member to be moved clockwise or counterclockwise with increases or decreases in engine speed respectively. Positioned on the end of lever 130 is a half-ball valve 140 which controls the flow of fluid through an orifice 142 in a conduit 144. $P_R$ pressure is supplied to conduit 144 where it is in communication through a bleed 146 with a cylinder 148 containing a piston 150. Piston 150 is connected to a shaft 152 which is pinned at point 154 to the lever 124. Shaft 152 also carries a plurality of lands forming part of valve structure 122 which controls the supply of actuating fluid at $P_R$ pressure through conduit 120 to the regulating valve 114. Lever 124 which is pivoted at point 154 on shaft 152 is in contact on its left end at point 156 with the metering valve 84. A spring 158 assures contact of the right hand end of lever 124 with the acceleration cam 98.

Operation of the device of FIGURE 2 may be best understood by first considering the operation when the parts are in the position as shown. As shown, pressure $P_R$ is supplied through valve 122, conduit 120, across the regulator valve 114 to the conduit 106, through bleeds 118 and into cylinder 102 on the right hand side of piston 100. This flow is also in communication with the deceleration bleeds 97 and conduit 96 and flows past the pilot valve 94 into the low $P_0$ pressure in the interior of the case. Fuel at $P_R$ pressure is also supplied to the left hand side of piston 100, and the pressures on the opposite sides of this piston are balanced so that cam 98 is stationary. The flow through the acceleration bleeds 118 and out past the deceleration bleeds 97 and the pilot valve 94 is the same, and there is, therefore, no unbalanced force available to move the piston 100. The pressure on the governor spring 128 is constant and balanced by means of the weight force from flyweights 134, therefore the half-ball valve 140 is maintained in a position such that flow through bleed 146 is effectively the same as that through bleed 142 and there is no effective pressure change acting against the bottom of piston 150. This means that the lever 124 is held in position and the metering valve 84 remains in the position shown. Assume now, that the lever 86 is moved in such a manner as to call for an acceleration of the associated engine. The increased cam rise through cam 90 will transmit a force through lever 92 closing off pilot valve 94. This effectively stops the flow through bleeds 97 and pressure builds up across bleeds 118 and against the right hand side of piston 110. The pressure regulator maintains the pressure drop across bleeds 118 as defined by the compression of spring 116 and the piston 100, which now experiences a pressure differential, is caused to move to the left carrying with it the cam surface 98. As cam surface 98 is moved to the left, the lever 124 will be caused to pivot around point 154 thus lowering point 156 and causing the effective area of the metering orifice to be increased. At the same time, the follower 126 increases the pressure applied by spring 128 on the lever 130, but due to the fact that increased fuel has been made available concurrently to the engine the resulting acceleration is sensed almost immediately by the flyweights 134 which provide an ever increasing force to balance the increasing force of the spring 128. There is, therefore, very little change in the effective position of half-ball valve 140 except on an instantaneous basis, and piston 150 remains in a position substantially as shown. As the timing piston 100 moves to the left, the contour of the cam 98 is such that lever 92 is gradually pivoted around its point of contact with cam 90 in such a manner that pilot valve 94 is opened again, thus permitting flow across the bleeds 97 and past the pilot valve 94 into the control case at $P_0$ pressure. This balances the system at the new value of speed selected by the power lever 86.

Upon a request for deceleration, movement of the power lever 86 will be in a direction to reduce the effective cam rise on cam 90 thus causing the pilot valve 94 to seek the position in which it affords very little restriction to the egress of actuating fluid from conduit 96 into the $P_0$ chamber. Flow from the right hand side of piston 100 then proceeds through a conduit 96 limited only by the deceleration bleeds 97 which flow is greater than that permitted by the bleeds 118 and piston 100 begins to move to the right. As the piston 100 moves to the right the cam 98 is also caused to move to the right thus pivoting lever 124 around point 154 and reducing the effective area of the metering valve. This causes a reduction in fuel flow to the engine thereby causing it to lose speed and this effect is sensed by the speed weights 134. At some point the cam surface 98 will reach a position where the lever 92 has been pivoted around the point of contact with cam 90, such that pilot valve 94 is again back in a position where flow through bleeds 118 and the flow across the bleeds 97 and the pilot valve 94 is the same and the piston 100 is stabilized at its new and lower speed position.

It sometimes happens that although an increased speed is requested and increased fuel flow is supplied to the engine, the engine fails to respond at a satisfactory rate. Should this happen, the movement of the piston 100 and the cam 98 toward the left which results in a compression of the governor spring 128 will cause the lever 130 to be moved in a counterclockwise direction and causing valve 140 to be moved to its maximum distance off of the valve seat 142 because the increased force of the governor spring is not compensated for by increased weight force from weights 134. This causes a substantial reduction in the pressure in cylinder 148 acting against the bottom side of piston 150 and shaft 154 is pulled downward carrying with it one of the lands of valve 122 and this land interrupts communication between the $P_R$ pressure source and conduit 120. Under the conditions described, the flow into conduit 120 is blocked and the power piston 100 is stopped. The metering orifice is, however, at a fairly large effective area thus causing a considerable amount of fuel to be supplied to the engine and this amount of fuel ultimately results in increased speed of the engine which will be sensed by the flyweights 134 resulting in the moving of follower 138 in an upward direction rotating arm 130 clockwise and causing the half-ball valve 140 to be seated on its seat 142. This results in an increased pressure acting against the bottom of piston 150 thereby causing it to rise, repositioning shaft 152, pivoting lever 124 around its right end and causing metering valve member 84 to be moved in an upward direction, reducing flow to the engine. At the same time the lands of valve member 122 are moved to the original operating position. $R_R$ pressure is now again in communication with the regulating valve and the timing bleeds 118 and the piston will continue to move to the left as requested by the lever 86 unless the engine again fails to respond in which case the same cycle is repeated.

Some of the operating characteristics of the control shown in FIGURE 2 are shown in the curves of FIGURES 3, 4 and 5. FIGURE 3 is a graph showing the manner in which this control schedules governor speed with respect to time. The characteristic is a curve which is substantially linear until a certain time period toward the end of the acceleration schedule is reached when it curves rapidly up to the right. This characteristic is actually designed into the contour of cam 98 and provides for fuel enrichment after the engine reaches a speed where compressor stall is no longer a problem. Actually, the characteristic of speed versus time for this control should show a family of curves of similar shape for varying values of inlet air pressures ($\delta$ factor). If the timing bleeds 118 were replaced with a needle valve structure providing a variable orifice controlled by means responsive to inlet air pressure, you would then get a characteristic such as that shown in FIGURE 4, where speed is plotted against time corrected for inlet pressure. From the foregoing, it is believed to be rather straightforward that a curve wherein acceleration corrected for inlet pressure is plotted against speed would appear as shown in FIGURE 5 where the acceleration is substantially linear until speed reaches a certain point and then the rate increases rather rapidly. This increased rate occurs at speeds above the compressor stall region of operation.

FIGURE 6 shows a sectional view of a modified form of a gas turbine engine control in which a timed acceleration schedule is provided and altitude or inlet pressure compensation is performed manually. This control is positioned within a housing 166 to which fuel is supplied at pressure $P_1$ from a pump 168 to an inlet conduit 170. Fuel at $P_1$ pressure surrounds a sleeve valve member 172 having a metering edge 174 which cooperates with a corresponding metering edge 176 in an enclosing cylindrical member 178. The metered flow at pressure $P_2$ in the interior of valve member 172 is in communication with an outlet conduit 180 through a pair of ports 182 and 184. Fuel not required by the engine is bypassed back to the pump 168 by means of a bypass valve 186 having an edge 188 which cooperates with an orifice in a corresponding stationary member 190 to establish the effective area of the bypass orifice. Valve member 186 is fastened to a diaphragm 192 and this diaphragm is biased in a direction to close the bypass valve 186 by means of the spring 194. A threaded member 196 acts through a spring retainer member 198 to vary the effective compression on spring 194. A plurality of small ports 200 are provided in the side of bypass valve member 186 so that fuel at $P_1$ pressure will be permitted to enter the chamber on the inside of the valve member 186 thus making $P_1$ pressure effective along the entire area of the bottom of diaphragm 192. The chamber 202 on the top side of diaphragm 192 is in communication with the metered fuel chamber on the inside of the metering valve member 172 through a conduit 204 having a bleed 206 therein. The pressure in chamber 202 is, therefore, at a value which may be somewhat below $P_2$ pressure and has been referred to as $P_2'$ pressure. It will now be observed that the same effective area of the diaphragm 192 is exposed to $P_2'$ pressure as is exposed to $P_1$ pressure and the diaphragm 192 therefore responds to the pressure differential ($P_1 - P_2'$). Chamber 202 is arranged to communicate with pressure at $P_0$ through a conduit 208 which is in communication with a pilot valve 210 and a conduit 286. As will be described hereinafter, the pilot valve 210 establishes or disestablishes communication between conduits 206 and 208 depending upon the axial position of the pilot valve 210. An engine driven governor structure is connected through a shaft 214 to a pair of governor flyweights 216 which produce a weight force varying with the square of engine speed and this force is opposed by means of a non-linear governor spring 218 such that the effective area defined by the metering orifice varies linearly with changes in speed of the shaft 214 and, hence, the speed of the associated engine.

Fuel at $P_1$ pressure is in communication through a conduit 220 having a bleed 222 with a rotary valve having an outside sleeve 224 positioned by the power lever 226 and an inside sleeve 228 connected to an arm 230 which carries a roller 232 held against the bottom edge of metering valve member 172 by means of a spring 234. The flow through conduit 220 and bleed 222 is in communication with a slot 236 on the surface of sleeve 224 and this slot, in turn, communicates with a conduit 238 which is drilled axially through the small sleeve 228. In this manner it will be observed that fuel can be supplied to a chamber below the timing piston consisting of a wall 240 forming part of valve 172 which pressure level is $P_1$ minus the pressure drop across bleed 222 and minus any pressure drop occurring across the restriction between sleeve 236 and axial passage 238. Axial passage 238 is also in communication through a slot 239 in sleeve 224 with a passage 242 leading to one side of a diaphragm 244 and also with a conduit 246 leading to the upstream 244 and also with a conduit 246 leading to the upstream side of a timing orifice 248 the effective area of which is controlled by means of a needle valve 250. Communication between the downstream side of the timing orifice 248 and the opposite side of the diaphragm 244 is afforded by means of a conduit 252. The diaphragm 244, then, is responsive to the pressure drop across the timing orifice 248 and this diaphragm carries with it a valve member 254 which effectively controls communication between conduit 252 and a conduit 256 which is in communication with pump inlet pressure $P_0$ in chamber 258.

A cut-off valve is shown at numeral 260 and is biased in a closing direction by a spring 262. During ordinary operation, the force of spring 262 is not sufficient to overcome the $P_2$ pressure acting on the top of valve 260 and its remains open. A chamber on the inside of this valve is in communication through a conduit 264 with $P_0$ pressure in conduit 256. Movement of the power lever 226 to a cut-off position rotates an arm 266 which effects the translation of a pilot valve 268 against the action of a spring 270. When this valve is moved upward, it brings the lower side of the cut-off valve 262 into communication with a conduit 272 which carries fuel at $P_1$ pressure from the inlet conduit 170 and cuts off communication of conduit 264 with pump inlet pressure $P_0$ through conduit 256 and this fuel pressure is sufficient to close the cut-off valve 260. When this occurs, a small valve 274 is pushed off its seat and the fuel at $P_2$ pressure is thus placed in communication with $P_0$ pressure through a conduit 276. This, of course, removes the hammering effect which would result if the cut-off valve were suddenly actuated and no means were supplied to relieve the metered fuel pressure chamber.

Figure 7:
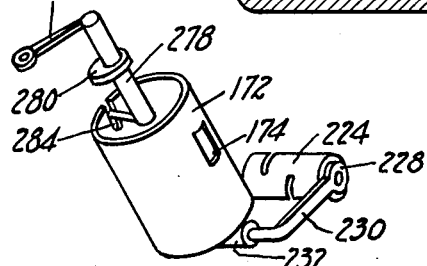
FIGURE 7 is a perspective view of the metering valve member and its actuating means of the control shown in FIGURE 6.
Figure 8:
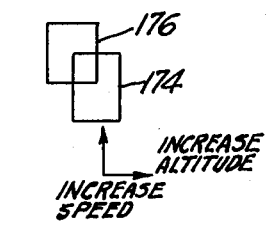
FIGURE 8 is a view showing the manner in which the effective area of the metering orifice of the device of FIGURE 6 is varied by movement of the valve member in either of two directions.

With reference to FIGURE 7, it may be observed that the movable metering valve element 172 is a sleeve-type member adapted to be moved axially in response to changes in control pressure $P_x$ and also rotationally through the action of a shaft 278 which carries a cam 280 and which is adapted to be rotated manually through the rotation of a lever 282 or through other means, not shown, responsive to changes in an altitude condition such as entering air pressure. Shown also in FIGURE 7 is the roller 232 which responds to axial movement of the valve member and translates through arm 230 a movement to the inner sleeve 228 of the rotary valve member. As member 282 is rotated in response to changes in altitude conditions the effective metering area is varied as shown in FIGURE 8 and this movement is transmitted to a slot in the valve member 172 by means of an arm 284. The cam 280 also presents a different contour to the timing valve needle 250 which is then moved axially to vary the effective area of timing orifice 248.

The device as shown is operating in a steady state condition with substantially no acceleration or deceleration taking place. Fuel at $P_1$ pressure flows from conduit 170 into conduit 220 through bleed 222 and into slot 236 in the rotary valve structure which is in very slight communication with the axial passage 238. A similarly slight amount of communication exists between this axial passage and the slot 239 communicating with passages 242 and 246. Under these conditions, a small amount of flow is permitted through the rotary valve means but this quantity is insufficient to cause a pressure change in the control pressure $P_x$ acting on the bottom of the metering valve piston 240. Upon a request for an acceleration, the power lever 226 is moved in the direction indicated causing communication to be interrupted between the slot 236 and the axial passage 238 and causing a substantial amount of registry between the slot 239 and the axial passage 238. Under these conditions, fuel at $P_x$ pressure is permitted to flow into conduit 242 and also into conduit 246 in communication with the timing orifice 248, thence out of conduit 252 to the upstream side of valve 254 and across this valve to the $P_0$ pressure level in passage 256. As the $P_x$ pressure level drops, the metering valve member 172 is forced in a downward direction by the pressure $P_2$ and the rate of downward movement is effectively controlled through control of the area of the timing orifice 248 as a constant pressure differential is maintained across this orifice by regulator valve 254. As the metering valve member 172 moves in a downward direction it increases the compression on the governor spring 218 and because of the increased effective area of the metering valve, more fuel is supplied to the engine resulting in higher engine speed and this is reflected in greater rotational speed of shaft 214 and in increased force exerted by the flyweights 216 against the governor spring 218. Should the engine attempt to accelerate too fast, the flyweight force would exceed the governor spring force, and cause pilot valve 210 to communicate conduit 208 with $P_0$ pressure through conduit 286. It will be observed, therefore, that acceleration always proceeds on the governor itself and the instantaneous rate of acceleration, which is reflected in the compression of the governor spring 218 is actually controlled through the effective area of the timing orifice 248.

It has previously been set forth how the bypass valve 188 and the associated diaphragm 192 operate to produce a constant $(P_1-P_2')$ pressure differential and it is, of course, quite apparent that the pressure differential across the metering orifice is $(P_1-P_2)$. The $(P_2-P_2')$ pressure differential is sensed across the bleed 206. The control of the metering area provides what is, in effect, a coarse adjustment of fuel flow, which adjustment is always in the direction of supplying somewhat more fuel than is actually required by the engine. This fuel flow is modified by means of the head regulator structure which in addition to bypass valve 188 and diaphragm 192 also consists of a flyweight controlled pilot valve 210 which controls communication between the fuel at $P_2'$ pressure in conduit 208 and fuel at $P_0$ pressure in sump 258. As the governor weights 216 fly outwardly indicating an increase in engine speed, the pilot valve 210 raises, thus communicating conduit 208 with a conduit 286 in communication with chamber 258. Actually, in view of the fact that the engine is always operating on the governor, this pilot valve mechanism will be effective to modify the head across the metering valve under substantially all conditions of operation. When the $P_2'$ pressure is reduced through operation of the pilot valve 210, the $P_2-P_2'$ differential becomes appreciable and the $P_1-P_2$ differential which is the effective metering valve pressure drop is reduced.

Under conditions of requested deceleration, the movement of the throttle 226 is such as to rotate the slot 236 in substantial registry with the axial passage 238 and communication is interrupted between the passage 238 and the slot 239 communicating with the timing bleed 248. Under these conditions $P_1$ pressure after flowing through orifice 222 is conducted directly into the $P_x$ chamber thereby causing an appreciable increase in the fluid pressure level acting against member 240. The metering valve 172 then begins moving in an upward direction effectively reducing the metering valve area and reducing the compression on spring 218. This causes flyweights 216 to fly outwardly, raising pilot valve 210 and communicating conduit 208 with conduit 206. This reduces the $P_2'$ pressure level and therefore the head across the metering valve, thereby reducing fuel.

Upon a change in altitude conditions, the arm 282 is rotated either manually or through additional means not shown, to present a change in the rise in cam 280 thus varying the effective area of the timing bleed and also to provide a rotation of valve member 172 which alters the effective metering area. The pressure drop across the timing bleed is controlled by means of the pressure regulating device consisting of diaphragm 244 and valve 254 which control the communication between passage 252 and passage 256. Inasmuch as the pressure level $P_x$ acting on the right side of diaphragm 244 is subject to substantial change in operation, the valve 254 acts to provide a corresponding pressure differential between the downstream side of timing bleed 248 and the $P_0$ pressure in conduit 256.

Should the engine fail to respond to a request for acceleration, there will be an increased fuel flow resulting from an increased effective area of the metering orifice which is not responded to by means of an increased flyweight force from flyweights 216. The increased governor spring force resulting from reduction of the pressure $P_x$ causes the flyweights to be collapsed inwardly thus moving the pilot valve 210 to its lowest position. This provides communication between a passage 212 containing fuel at $P_1$ pressure and the $P_x$ chamber resulting in a rapid rise in the effective pressure operating against the timing piston and causing the metering valve to either stop or to begin moving in an upward direction thus decreasing the metering area. This continues until the engine responds such that the flyweight force is again able to balance the effective governor spring force.

Figure 9:
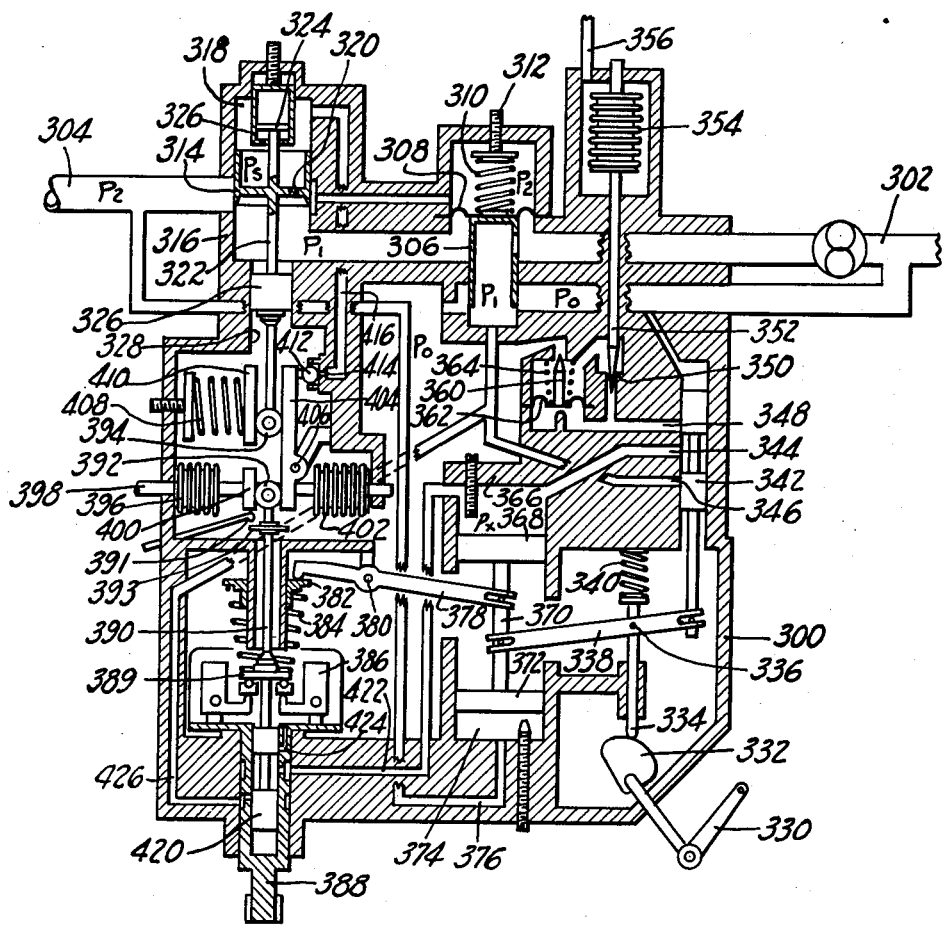
FIGURE 9 is a sectional view of a gas turbine engine control utilizing our hydraulic timing device where acceleration timing is biased by inlet air pressure and fuel flow is biased with changes in compressor discharge pressure.

FIGURE 9 shows a gas turbine fuel control in which a timed acceleration schedule is provided and in which the timing is biased by inlet air pressure. Fuel flow to the engine is also biased as a function of compressor discharge pressure. The fuel control is installed in a casing 300 communicating with a source of fuel under $P_1$ pressure through a conduit 302 and with an engine through a conduit 304 containing metered fuel at $P_2$ pressure. A bypass valve 306 connected to a diaphragm 308 controls the amount of fuel bypassed to the source at pressure $P_0$. Diaphragm 308 is exposed to the $P_1-P_2$ pressure differential and is biased by means of a spring 310 having its effective force adjustable by means of a member 312 threadedly engaged with housing 300. A metering valve 314 is reciprocable in a cylinder 316 formed in housing 300. The metering valve acts in combination with the cylinder 316 to define a chamber 318. Pressure at $P_1$ is supplied to the interior of chamber 318 through a small bleed 320 located in the metering valve member 314. Carried by valve member 314 is a shaft 322 which has positioned thereon a member 324 adapted to abut against a stop member 326. Member 326 is shown threadedly engaged with housing 300 and provides an adjustable minimum flow stop. Also carried on shaft 322 is a piston 326 adapted to reciprocate in a cylinder 328 forming part of the housing 300.

Speed changes are requested by means of a power lever 330 connected to a cam 332. Rotation of the cam causes axial movement of a follower member 334 which is pinned at point 336 to a lever 338 and which is spring loaded against the surface of cam 332 by means of a spring 340. Attached to the right end of lever 338 is a pilot valve member 342 which controls communication between a conduit 344 and either of a pair of conduits 346 and 348 depending upon its position. Conduit 346 is in communication with fuel at pressure $P_1$ in the interior of bypass valve member 306. Conduit 348 is in communication with fuel at $P_0$ pressure in the interior of case 300 across a timing orifice 350, the effective area of which is controlled by means of a needle valve 352. Valve 352 is positioned by means of an evacuated bellows 354, the outside of which is in communication through a conduit 356 with compressor inlet pressure. The effective pressure drop across the timing bleed 350 is controlled by means of a regulating valve member 360 carried by a diaphragm 362 which is spring loaded in the opening direction through the action of a spring 364. Conduit 344 is in communication with a control pressure chamber formed of a cylinder 366 and a timing piston 368. The piston 368 carries a shaft 370 to which the left end of lever 338 is attached. Fastened to the opposite end of shaft 370 is a piston 372 which reciprocates in an extension of cylinder 366 and controls the effective volume of a chamber 374. Chamber 374 is in communication with metered fuel at $P_2$ pressure through a conduit 376. Also attached to the shaft 370 is a lever 378 which is fastened to a stationary pivot 380 attached to housing 300. The opposite end of lever 378 is in contact with a retainer member 382 which acts to vary the compressive force on a non-linear governor spring 384. The force of spring 384 is opposed by means of a pair of flyweights 386 driven proportional to engine speed by means of a shaft 388 connected to the associated engine. Any force differential occurring between the spring 384 and the governor weights 386 is reflected in axial movement of a spring retainer 389 and a shaft 390 having attached at its opposite end a roller assembly 392. Maximum upward travel of shaft 390 is limited by a stop 391 which is adapted to engage a collar 393 on said shaft. It will be observed that a similar roller mechanism 394 is connected to the lower end of shaft 322. A bellows 396 is in communication through a conduit 398 with compressor discharge pressure and the opposite end of this bellows is connected through a force transmitting means 400 to exert a lateral force on the rotating member 392. A second evacuated bellows 402 is also connected to member 400 in order to provide an absolute value of compressor discharge pressure. The lateral force transmitted by member 396 to the rotating member 392 is, in turn, transmitted to the lower end of a lever 404 pivoted on a point 406 attached to the case 300. Similarly, the force exerted by means of a spring 408 on a spring retainer and force transmitting member 410 is transmitted through the rotating member 394 to the lever 404. At the top end of lever 404 is positioned a spherical valve member 412 adapted to close an orifice 414 which controls communication between a conduit 416 and the fuel at $P_0$ pressure in the interior of the case 300. The structure including rotating members 392 and 394, bellows 396 and 402 and the force transmitting member 400, the spring 408 and the force transmitting member 410, and the lever 404 and valve 412 collectively serve as a means of multiplying the various signals effective in the system. The ultimate task of the multiplying organization is to control the effective position of valve 412 with respect to orifice 414 to thereby control the servo pressure level $P_s$ acting on the top side of the metering valve member 314. When the flow through bleed 320 equals the flow through orifice 414, there will be no movement of the metering valve 314. Under such conditions, the forces acting on the lever 404 on each side of the pivot point 406 must be equal, i.e., the lateral force transmitted against the rotating member 392 times its lever arm must equal the lateral force transmitted by rotating member 394 plus its lever arm. When an unbalance occurs in either direction, valve 412 is caused to either increase or decrease the effective area of orifice 414 and the pressure $P_s$ acting on the metering valve 314 is varied accordingly causing movement of the metering valve and also of the shaft 322 and a corresponding movement of the rotating member 394 in such direction as to bring about an equilibrium in the forces acting against the lever 404. Attached to the lower spring retainer 389 of the governor structure is a pilot valve structure 420 which operates in a manner similar to the pilot valve 210 of FIGURE 6. A conduit 422 in communication with the control pressure $P_x$ acting against timing piston 368 is in communication with the chamber between the two lands of the pilot valve 420. As shown, this chamber has no outlet and the pilot valve structure makes no change in the effective pressure level acting against the piston 368. Should the engine tend to overspeed some predetermined amount, the governor weights 386 will fly outwardly thus raising the pilot valve 220 and providing communication between conduit 422 and a conduit 424 which communicates with pressure at pressure $P_0$ in the interior of the casing 300. The $P_x$ pressure is then effectively dumped to $P_0$ pressure and the pistons 368 and 372 are moved in an upward direction as a result of the $P_2$ pressure acting in chambers 374. This causes the lever 338 to be rotated in such a direction as to cause pilot valve 342 to provide communication between conduits 346 and 344 thus introducing pressure $P_1$ into the $P_x$ chamber and stabilizing the position of the pistons 368 and 372 at a new value corresponding to the actual speed sensed. Should the engine fail to respond to a request for increased speed the flyweights 386 will be caused to collapse inwardly under the force of governor spring 384 and the pilot valve 420 will be moved to its bottom position. Under these conditions communication will be established between a conduit 426 carrying fuel at $P_1$ pressure from the bypass valve 306 to the conduit 422 which leads to the $P_x$ pressure acting on piston 368. This causes a $P_x$ pressure increase resulting in a downward movement of pistons 368 and 372 thereby rotating lever 378 clockwise around the pivot point 380 and relaxing the compression on the governor spring 384. The lever 338 is also pivoted around point 336 and pilot valve 342 is moved in a direction to cause communication between conduits 344 and 348 thus permitting some of the $P_x$ pressure to be exhausted past the timing bleed 350 and the regulating valve 360.

Operation of the control of FIGURE 9 may be best understood through a consideration of some typical operating conditions. As shown, the control is operating under a steady state condition. The pilot valve 342 is in a position where it blocks communication to both of conduits 346 and 348 therefore there is no $P_x$ pressure change acting against the timing piston 368 and this piston is maintained stationary at a position which is indicative of the speed of the associated engine. A request for an acceleration is accomplished by rotating power lever 330 in the direction indicated which causes cam 332 to present a greater rise to follower member 334, thereby rotating lever 338 around its left end and moving pilot valve 342 upwardly to provide communication between passages 344 and 348. This permits the $P_x$ pressure acting against piston 368 to be exhausted out past the timing orifice 350 and the regulating orifice 360. This causes the timing piston 368 to be moved upwardly and as it does so it causes lever 358 to be pivoted around point 380 in such manner as to increase the compression of the governor spring 384. This increased force which is not immediately offset through increased governor weight force causes the spring retainer 389 and the shaft 390 to be moved downwardly carrying with them the rotating member 392. As member 392 is moved downwardly it increases the effective lever arm of the force exerted by the compressor discharge pressure responsive bellows 396 through member 392 on lever 404 and this force, not being balanced by the force exerted through member 394, is sufficient to lift the spherical valve member 412 from its seat thereby dumping the $P_x$ pressure acting on the top of the metering valve member 314 into the $P_0$ pressure chamber in the interior of the case 300. This will cause the metering valve member 314 to move in an opening direction because of the $P_1$ pressure acting on the bottom of it. As it moves in the opening direction it carries with it the shaft 322, piston 326 and the rotating member 392.

Ultimately, the rotating member 392 reaches a new position where the lever arm through which the force of spring 408 is transmitted is again of such length that said force is sufficient to balance the force exerted through member 392 and the servo valve 412 is again moved near its seat permitting the $P_x$ pressure to build up to a value sufficient to maintain the metering valve in the desired position. It will be remembered that the increased pressure exerted by lever 378 on the governor spring 384 proceeds only at a rate permitted by the travel of piston 368 and its associated shaft 370 and that travel is established by the rate at which $P_x$ pressure is permitted to be exhausted past the timing bleed 350. The upward movement of the piston 368 and shaft 370 also causes lever 338 to pivot around point 336 thus gradually pulling the pilot valve 342 back toward the position shown thus interrupting the flow between conduits 344 and 348 and stabilizing the system at the new higher requested speed value.

Should the engine fail to respond to a requested speed increase, it will result in a failure of the force exerted by the flyweights 386 to match the governor spring force and these flyweights will be collapsed inwardly causing the pivot valve member 420 to be moved to its lowest position and providing communication between conduits 426 and 422. Fuel at $P_1$ pressure is then communicated with the $P_x$ chamber and the further upward movement of the timing piston 368 is stopped. Any further increase in $P_x$ pressure causes the timing position to move downwardly until the engine speed again balances the governor spring force. On a request for deceleration the power lever 330 is moved in such direction as to present a reduced rise of cam surface 332 to follower member 334 and the lever 338 pulls the pilot valve 342 downwardly thereby providing communication between conduits 344 and 346. This causes fuel at $P_1$ pressure or $P_1$ pressure minus any drop across the pilot valve to be conducted to the $P_x$ pressure chamber acting on piston 368. This causes a downward movement of the piston 368 pivoting the lever 378 toward a position where the force on the governor spring 384 is relaxed. This causes the pilot valve 420 to be moved upwardly, communicating the $P_x$ pressure acting on piston 368 with $P_0$ pressure, thereby reducing the $P_x$ pressure level. This serves to insure that the position of piston 368 is always a good indication of actual engine speed. The governor weight force transmitted through the follower 389 and the shaft 390 causes rotating member 392 to be moved upwardly reducing the lever arm acting on the lower side of lever 404 below pivot 406 and causing the servo valve 412 to be closed because of the force exerted by spring 408. This results in a rapid increase in the pressure rise in the $P_x$ chamber 318 and the metering valve 314 is then caused to move in a closing direction. As it moves downwardly it carries with it the rotating member 394 until this member reaches a new position where the lever arm of the force of spring 408 is only sufficient to offset that of the lever arm through which the member 392 acts. The system is then again stabilized at the new position of the metering valve. The downward movement of the piston 368, of course, causes the lever 338 to be rotated around its pivot point 336 and the pilot valve 342 is again gradually moved to the position shown where communication between conduits 344 and 346 is again interrupted. If, at any time, during operation of the associated engine there is a change in the value of compressor discharge pressure acting upon bellows 396, this change is reflected in a change in the force acting on member 392 and this change will be immediately reflected in the operation of the servo valve 412 and associated movement of the metering valve 314 as described. Similarly, changes in the value of compressor inlet pressure will cause a change in the effective length of bellows 354 and move the needle valve 392 in and out of the timing orifice 350. This, of course, changes the timing characteristics of the control with changes in altitude conditions.

Although only a limited number of embodiments have been shown and described herein, modifications may be made to suit the requirements of individual applications.

We claim:

1. A fuel control for an engine having a compressor including a fuel conduit to said engine, a metering valve in said conduit, a bypass valve for controlling the pressure drop across said metering valve, a multiplying device operatively connected to said metering valve, an all-speed governor including a governor spring operably connected to said multiplying device, means responsive to a compressor generated pressure operatively connected to said multiplying device, a cylinder, a piston in said cylinder, means movable in response to movement of said piston for varying the effective force of said governor spring, a pilot valve connected to said cylinder and operative when in a first position to provide communication between said cylinder and a source of high pressure fuel upstream of said metering valve, when in a second position to provide communication between said cylinder and a passage communicating with a low fluid pressure source, and when in a third position to block communication between said cylinder and said sources, operator operated means for causing said pilot valve to assume either of said first or second positions and follow-up means responsive to movement of said piston to cause said pilot valve to seek said third position, a timing bleed in said passage, means continuously responsive to a variable input signal indicative of a desired schedule of engine operation operatively connected to said timing bleed for varying the effective area thereof as a function of said variable input signal during operation of the engine and regulating means for maintaining a desired pressure drop across said bleed.

2. A fuel control as set forth in claim 1 wherein means responsive to engine inlet pressure are provided for varying the effective area of said timing bleed.

3. A fuel control as set forth in claim 1 wherein said metering valve includes an actuating piston and said multiplying device comprises a control valve for varying the effective fluid pressure on said actuating piston, a lever attached to said valve, means exerting a substantially constant reference force against said lever on one side of its fulcrum, and means movable in response to the movement of said metering valve for varying the effective lever arm through which said reference force acts, said means responsive to a compressor generated pressure exerting a variable force on said lever in opposition to said reference force, and said connection from said all-speed governor to said multiplying device including means for varying the effective lever arm through which said variable force acts.

4. A fuel control as set forth in claim 1 wherein said metering valve includes an actuating piston and said multiplying device includes a control valve for varying the effective fluid pressure on said actuating piston, a lever operatively connected to said control valve and mounted for pivotal movement about a fixed pivot, said means responsive to a compressor generated pressure exerting a force on one side of said lever, a roller actuated as a function of engine speed and movable along said lever for varying the effective lever arm through which said compressor pressure responsive means acts, resilient means exerting a substantially constant reference force on said lever in opposition to said force derived from said compressor pressure responsive means, a roller operatively connected to said actuating piston and movable along said lever for varying the effective lever arm through which said substantially constant reference force derived from said resilient means acts.

5. A fuel control as set forth in claim 1 wherein additional pilot valve means controlled by said all-speed governor is provided for communicating said cylinder with said low pressure source.

6. A fuel control as set forth in claim 5 wherein said additional pilot valve means also has a position wherein communication is effected between said cylinder and said source of high pressure fuel.

7. A fuel control device for an engine including a fuel conduit to the engine, a metering valve in said conduit, means for controlling the head across said metering valve, an all-speed governor including a governor spring connected to vary the flow through said metering valve, a cylinder and a piston in said cylinder operatively connected to said governor spring, a first passage communicating said cylinder with a source of high pressure fluid, a second passage communicating said cylinder with a source of low pressure fluid, a restriction in one of said passages and means for controlling the pressure drop across said restriction, and a power lever connected to control communication between at least one of said sources and said piston for controlling the position of said piston in said cylinder, said means for controlling the pressure drop across said restriction including a pressure differential responsive member, a by-pass valve driven by said member, and a pilot valve, said governor including a speed responsive member operatively connected to said pilot valve to vary the pressure differential across said pressure responsive member.

8. A fuel control device as set forth in claim 7 wherein a third passage is provided communicating said piston with said source of high pressure fluid, and said pilot valve means is normally effective to block said third passage and is operative to open said passage upon the occurrence of an under-speed error condition in excess of a predetermined quantity.

9. A fuel control device for an engine including a fuel conduit to the engine, a metering valve in said conduit, means for controlling the head across said metering valve, an all-speed governor including a governor spring connected to vary the flow through said metering valve, a cylinder and a piston in said cylinder operatively connected to said governor spring, a first passage communicating said cylinder with a source of high pressure fluid, a second passage communicating said cylinder with a source of low pressure fluid, a restriction in one of said passages, means for controlling the pressure drop across said restriction, a power lever connected to control communication between at least one of said sources and said cylinder for controlling the position of said piston in said cylinder, and means responsive to a variable input signal operatively connected to said restriction continuously varying the effective area thereof as a function of said variable input signal during operation of the engine.

10. A fuel control device for an engine including a fuel conduit to the engine, a metering valve in said conduit, means for controlling the head across said metering valve, an all-speed governor including a governor spring connected to vary the flow through said metering valve, a cylinder and a piston in said cylinder operatively connected to said governor spring, a first passage communicating said cylinder with a source of high pressure fluid, a second passage communicating said cylinder with a source of low pressure fluid, a restriction in one of said passages, means for controlling the pressure drop across said restriction, a power lever for controlling operation of the engine, a valve device connected to said first and second passages and to said power lever, said power lever being movable in one direction to request an acceleration of the engine and cause said valve device to move in a direction to prohibit flow through said first passage and to increase flow through said second passage, said power lever being movable in an opposite direction to request a deceleration of the engine and cause said valve device to move in a direction to prohibit flow through said second passage and to increase flow through said first passage, and means responsive to a variable input signal operatively connected to said restriction for continuously varying the effective area thereof as a function of said variable input signal during operation of the engine.

11. A fuel control device as set forth in claim 10 wherein lever means are connected to said piston for causing said valve device to seek a position where both of said passages are substantially blocked as said piston reaches the end of its requested travel.

12. A fuel control device as set forth in claim 10 wherein ambient pressure responsive means are provided for varying the effective area of said restriction.

13. A fuel control device for an engine including a fuel conduit to the engine, a metering valve in said conduit, means for controlling the head across said metering valve, a power lever for controlling the operation of the engine, an all-speed governor including a governor spring connected to vary the flow through said metering valve, a cylinder and a piston slidable therein, a cam member contoured as a nonlinear function of power lever position and actuated by said piston, a follower member operatively connected to said cam member and said governor spring for causing a variation in the force of said spring as a function of the position of said cam member, a first passage communicating said cylinder with a source of high pressure fluid, a second passage communicating said cylinder with a source of low pressure fluid, a restriction in one of said passages and means for controlling the pressure drop across said restriction, and means responsive to power lever position operatively connected to at least one of said sources for controlling communication between the same and said piston to control the position of said piston in said cylinder.

14. A fuel control device for an engine as set forth in claim 13 wherein a lever is provided having one end positioned effective to control the position of said metering valve, the other end riding on a surface of said cam member, and said governor is effective to control the position of the pivot point of said lever.

References Cited in the file of this patent

UNITED STATES PATENTS

| | | |
|---|---|---|
| 1,853,613 | Herr | Apr. 12, 1932 |
| 1,972,462 | Schafer | Sept. 4, 1934 |
| 2,042,374 | Wunsch | May 26, 1936 |
| 2,288,830 | Nye | July 7, 1942 |
| 2,521,477 | Pellettere | Sept. 5, 1950 |
| 2,536,158 | Chamberlin | Jan. 2, 1951 |
| 2,560,914 | Almeras | July 17, 1951 |
| 2,573,724 | Neal | Nov. 6, 1951 |
| 2,576,352 | Neal | Nov. 27, 1951 |
| 2,590,340 | Mordell | Mar. 25, 1952 |
| 2,631,599 | Markson | Mar. 17, 1953 |
| 2,632,456 | Breedlove | Mar. 24, 1953 |
| 2,720,752 | Chandler | Oct. 18, 1955 |
| 2,856,175 | Martz | Oct. 14, 1958 |
| 2,879,643 | Stroh et al. | Mar. 31, 1959 |
| 2,910,084 | Frantz | Oct. 27, 1959 |
| 2,917,061 | Longfellow | Dec. 15, 1959 |

UNITED STATES PATENT OFFICE
CERTIFICATE OF CORRECTION

Patent No. 3,075,350　　　　　　　　　　　　　January 29, 1963

Howard L. McCombs et al.

It is hereby certified that error appears in the above numbered patent requiring correction and that the said Letters Patent should read as corrected below.

Column 6, line 18, for "ffuid" read -- fluid --; column 13, line 17, after "thus" insert -- again --; column 15, line 50, after "restriction", insert -- for --.

Signed and sealed this 24th day of September 1963.

(SEAL)
Attest:

ERNEST W. SWIDER
Attesting Officer

DAVID L. LADD
Commissioner of Patents